(12) United States Patent
Jain et al.

(10) Patent No.: US 10,437,902 B1
(45) Date of Patent: Oct. 8, 2019

(54) EXTRACTING PRODUCT REFERENCES FROM UNSTRUCTURED TEXT

(71) Applicant: A9.com, Inc., Palo Alto, CA (US)

(72) Inventors: Deepak Jain, Los Altos, CA (US); Matthew Hamilton Battles, Palo Alto, CA (US); Nicolas Bruce Trown, Pleasanton, CA (US)

(73) Assignee: A9.com, Inc., Palo Alto, CA (US)

( * ) Notice: Subject to any disclaimer, the term of this patent is extended or adjusted under 35 U.S.C. 154(b) by 668 days.

(21) Appl. No.: 13/865,109

(22) Filed: Apr. 17, 2013

(51) Int. Cl.
*G06F 16/00* (2019.01)
*G06F 16/955* (2019.01)
*G06F 16/9535* (2019.01)
*G06Q 30/02* (2012.01)
*G06F 16/958* (2019.01)

(52) U.S. Cl.
CPC .......... *G06F 16/955* (2019.01); *G06F 16/958* (2019.01); *G06F 16/9535* (2019.01); *G06Q 30/0278* (2013.01)

(58) Field of Classification Search
CPC .......... G06F 17/30876; G06F 16/9535; G06F 16/958; G06F 16/955; G06Q 30/02; G06Q 30/0278; G06Q 30/0282
USPC ........................................................ 707/708
See application file for complete search history.

(56) References Cited

U.S. PATENT DOCUMENTS

| | | | |
|---|---|---|---|
| 8,359,309 B1 * | 1/2013 | Provine et al. | 707/721 |
| 8,838,618 B1 * | 9/2014 | Wu et al. | 707/750 |
| 2007/0112764 A1 * | 5/2007 | Yih et al. | 707/5 |
| 2012/0036123 A1 * | 2/2012 | Hasan | G06F 17/30386 707/723 |
| 2013/0138641 A1 * | 5/2013 | Korolev et al. | 707/730 |
| 2013/0159507 A1 * | 6/2013 | Mason | G06Q 30/02 709/224 |

\* cited by examiner

*Primary Examiner* — Vincent F Boccio
(74) *Attorney, Agent, or Firm* — Hogan Lovells US, LLP

(57) ABSTRACT

Various embodiments identify candidate phrases users have used to reference a product in previous searches by analyzing query logs of a search engine. Upon identifying a candidate phrase within a volume of unstructured text, the candidate phrase is compared against a corpus of contemporary language. A frequency of each candidate phrase in contemporary language and the same in the query logs are determined and used as an indication to distinguish between genuine product references in the text or their normal use in common language in order to determine whether the volume of unstructured text is suitable, based on the number of references, for a hyperlink to a product page for the product of an electronic marketplace. Furthermore, behavioral data associated with user interaction with various aspects of the hyperlinks can be tracked over time to better identify suitable product references and tailor future hyperlink suggestions.

25 Claims, 7 Drawing Sheets

EXTRACTING PRODUCT REFERENCES FROM UNSTRUCTURED TEXT

BACKGROUND

Since products are often referred to by a number of different names or titles, identifying references to the same in unstructured text is a challenging problem. For example, users searching web-based content may refer to a product by a phrase that is a variant of, or syntactically unconnected with, the title, including a phrase that might refer to a group of products. Further, a product may be referred to by different names from one webpage to another or a product may be referred to by multiple different names within a single webpage. Additionally, it is also often difficult to distinguish between cases where a phrase is referring to a product or is simply being used ordinarily in everyday language. Accordingly, there is a need to be able to more adequately identify product references in unstructured text that are a variant of, or syntactically unconnected with, a product's title for applications ranging from contextually targeted advertisements to monetizing content via affiliate marketing networks to improving the overall quality and efficiency of search engines. Therefore, as technology advances and as people are increasingly relying on computing devices in a wider variety of ways, it can be advantageous to adapt the ways in which these product references are identified and extracted from unstructured text.

BRIEF DESCRIPTION OF THE DRAWINGS

Various embodiments in accordance with the present disclosure will be described with reference to the drawings, in which.

DETAILED DESCRIPTION

Figure 1:
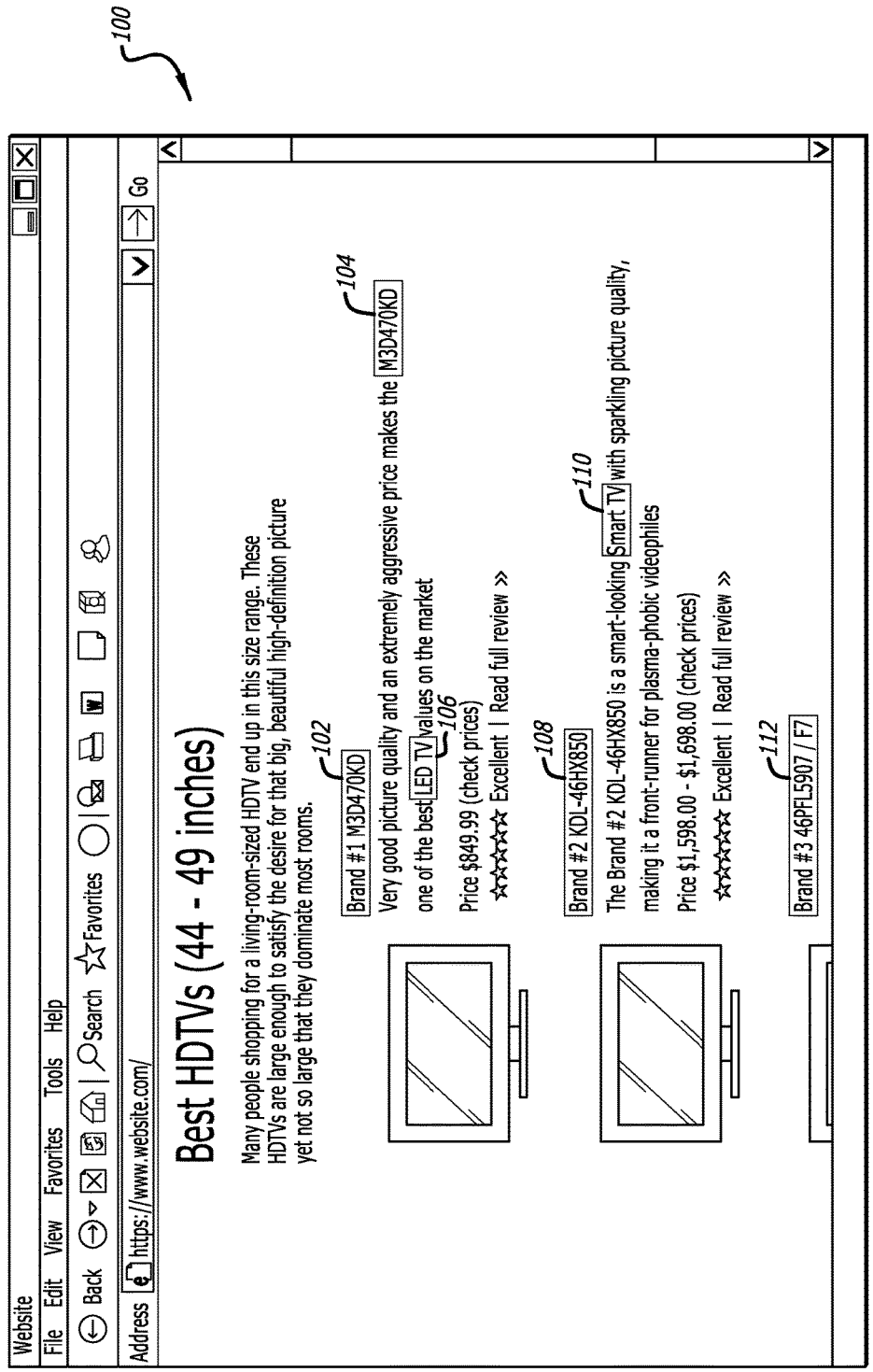
FIG. 1 illustrates an example webpage of unstructured textual content in accordance with at least one embodiment.

Systems and methods in accordance with various embodiments of the present disclosure may overcome one or more of the aforementioned and other deficiencies experienced in conventional approaches to identifying references in unstructured content. In particular, various approaches can identify textual references relating to an item that may differ in at least some aspect from the item's name, type, or general subject matter. For example, an item can be referenced in a volume of text by its name, make, model, general subject matter, or any combination, permutation, or variant of the same. In order to identify item references and distinguish the same from a particular phrase's normal use in everyday language, search phrases that users have used to reference items or subjects in previous searches are identified by analyzing query logs of a search engine.

In at least one embodiment, upon identifying one or more of these candidate phrases within a volume of text, the candidate phrases are compared against a corpus of contemporary language stored in a database. A frequency, or rate of occurrence, of each candidate phrase in contemporary language and a frequency of the same in the query logs is then used as an indication to distinguish between genuine item or subject references in the text or their normal use in common language. In at least one example, a query log match score is computed by multiplying a ratio of these two frequencies by a number of times a respective candidate phrase, or one or more candidate phrases indicative of the same item or subject, appears in the text. This value can then be used to determine whether the candidate phrase, or the one or more candidate phrases indicative of a same item or subject, is a genuine reference by being above a threshold value, for example. Accordingly, once a genuine reference is identified, the reference in the volume of text can be converted into a hyperlink for monetization via an affiliate marketing network, used for contextual targeting of advertisements, indexed for use in a variety of search applications, and the like.

In at least one embodiment, the candidate phrases are associated with at least one word for a product and an electronic marketplace can identify these references to products in an automated fashion for converting the same, provided by third party publishers on a website (e.g. blog, news source, and the like), into hyperlinks to a product or a product search results page to monetize the content. For example, a publisher routinely writing about cameras on a photography blog could provide hyperlinked keywords or phrases within their articles or information pages to associated camera product pages of the electronic marketplace. If the visitors of the publisher's website click on a hyperlink and purchase a corresponding product, the publisher may be provided with a percentage of the profits or revenue for the same.

Furthermore, behavioral data associated with user and/or publisher interaction with various aspects of the hyperlinks can be tracked over time to better identify suitable product references and tailor future hyperlink suggestions. For example, interaction with items of content (e.g., viewing, purchasing items, conversion, abandonment, accepting a hyperlink, etc.) responsive to search requests or hyperlink selections including particular candidate phrases may increase associated query log match scores. Additionally, the electronic marketplace can contact a publisher and suggest keywords or phrases within their content for which to provide as hyperlinks to products. The publisher's decision to accept the hyperlink or not can further provide feedback for making future offers and suggestions.

Various other functions and advantages are described and suggested below as may be provided in accordance with the various embodiments.

FIG. 1 illustrates an example webpage 100 shown to illustrate at least one challenge of identifying textual references within a volume of text. In this example, the webpage 100 includes results for users to browse and compare different models of televisions (TVs). Included on the page, therefore, will be textual references of a TV's brand name, display size, types (e.g. LED, LCD, Plasma), model name, and the like for each TV. Each of these textual references is indicative of a particular product, a class of products, or both. For example, the webpage 100 is titled "Best HDTVs (44-49 inches)" and includes textual references "LED TV" 106 and "Smart TV" 110 that are indicative of a particular class of TVs. Additionally, each television on the webpage 100 is represented by at least one image and a name, which can include the brand name and model number among other items. For example, the full name of the first television 102 is "Brand #1 M3D470KD 47-inch 1080p 240 Hz Phazor LED Smart 3D HDTV" the full name of the second television 108 is "Brand #2 KDL-46HX850 46-inch 1080p 240 Hz LED HDTV," and the full name of the third television 112 is "Brand #3 46PFL5907/F7 46-inch 1080p Smart 3D HDTV." Outside of media categories, products are frequently not referenced by their full product names in free text. These and many other possible variants thereof are indicative of a particular product. However, each of these products can be referred to in many different ways. For example, the first television 102 can be referred to as "Brand #1 M3D470KD" 104, "the Brand #1 47-inch LED," "the M3D470KD," "the 47" M3D470KD," "the 47" Brand #1," and so on. Additionally, each of the second television 108 and the third television 112 can have similar abbreviations, shortened names/title, or references that are syntactically unconnected to the product's name or title. This example, however, is straight forward in suggesting that the subject matter within the webpage 100 is associated with TVs and would, therefore, be ideal to advertise a particular TV or at least a product generally complimentary thereto, on the same.

Identifying subject matter or a particular item within a webpage becomes more complicated, however, when an advertiser is attempting to place an advertisement of a product that is complementary to a specific item or brand. In order to achieve a finer level of granularity of ad targeting than that described above with respect to FIG. 1, however, it would be advantageous to be able to identify as many possible abbreviations, shortened names/title, or syntactically unconnected references to a product in a volume of text as possible. For example, in some instances, an advertiser would like to place ads for a specific brand or type of TV where just knowing that a webpage contained textual references for TVs in general would not be entirely sufficient. In this example, placing an ad for a mounting system on the webpage 100 that is only compatible with Brand #4, that is not represented therein, would likely be a waste of resources (e.g. ad space, costs, opportunity for other ad placement therein, etc.). In another example, an advertiser may want to place an ad for three-dimensional (3D) glasses on a webpage containing 3D TVs, but would need to know with a fair degree of certainty that the page did in fact contain the same in order to justify expending advertising resources.

Figure 2:
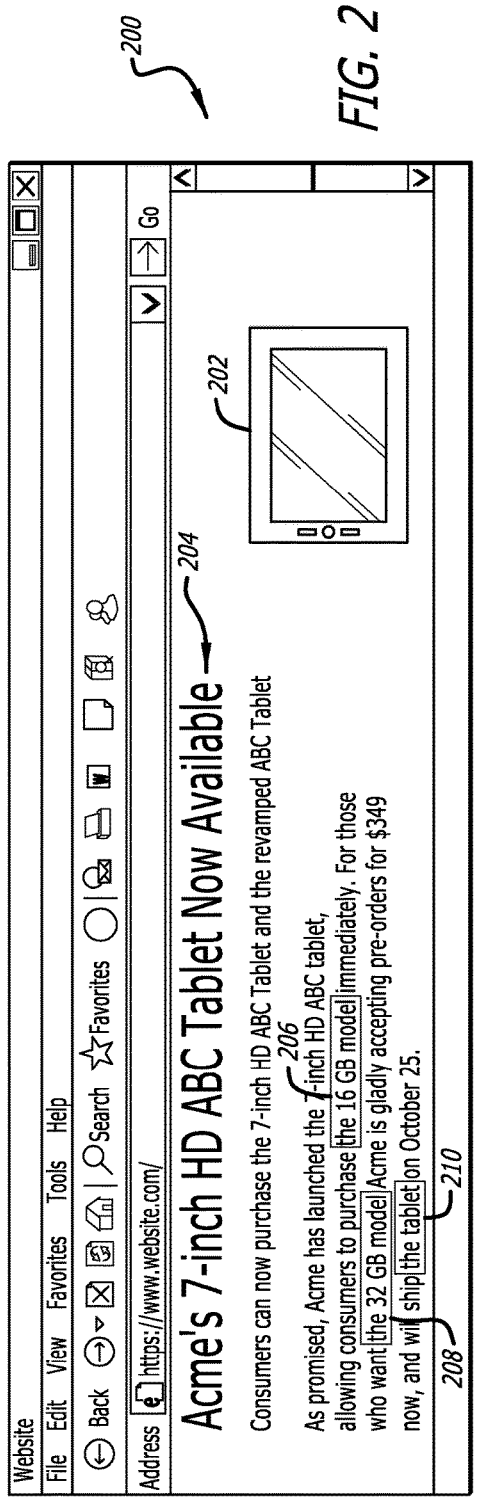
FIG. 2 illustrates another example webpage of unstructured textual content in accordance with at least one embodiment.

FIG. 2 illustrates an example blog page of an article 200 shown to illustrate another challenge of identifying textual references within a volume of text. In this example, the article 200 contains an image of the product 202, the article's title 204 that includes the name of the product 202, which is the "Acme 7-inch HD ABC Tablet," in this example, and multiple references to the product 202 that are either abbreviations, a shortened name/title, or a syntactically unconnected reference including "the 16 GB model" 206, "the 32 GB model," 208, and "the tablet" 210. In this example, a conventional web-crawler, or other web content scanning/classifying tool, may only be able to identify a few references to the product 202 that are substantially similar to the product's title in the article; however, many more are present. For example, the references "the 16 GB model" 206, "the 32 GB model," 208, and "the tablet" 210 could also refer to many other items, however, each refer to the product 202 in the context of the article. Therefore, being able to identify various types of references to the product 202 would be an important tool for an electronic marketplace to be able to identify a number of product references in order to determine whether the article 200 is suitable, based on the number of references, for one or more hyperlinks to a product page for the product 202, for advertisers to provide users with advertisements relevant to the product 202, and the like.

Figure 3:
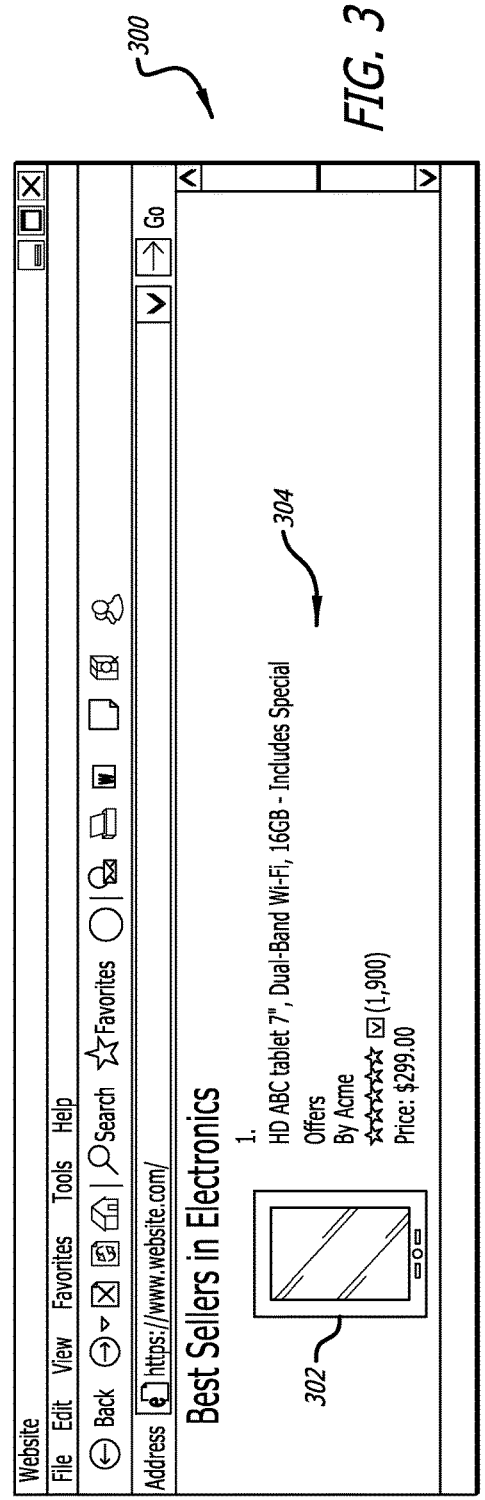
FIG. 3 illustrates another example webpage of unstructured textual content in accordance with at least one embodiment.

FIG. 3 illustrates another example webpage 300 shown to illustrate another example challenge of identifying textual references within a volume of text. In this example, the webpage 300 includes a product page for users to view, research, and purchase the "Acme 7-inch HD ABC Tablet," described above. In this example, the webpage 300 includes a picture of the tablet 302 and a product description 304. Within the product description 304, the "Acme 7-inch HD ABC Tablet" can be referred to in many different ways, which may not always use the tablet's full name. For example, the tablet 302 can be referred to as "the tablet," the "ABC tablet," the "HD ABC tablet," the "7-inch HD ABC," "Next-Generation ABC," "ABC Special Offer," and so on. Further, such textual references can also refer to other unrelated products that bear no relation to, for example, the "Acme 7-inch HD ABC Tablet." For example, the "ABC tablet," the "Next-Generation ABC," or the "ABC Special Offer" could refer to other products from a toy chalkboard product for children, computer aided alphabet learning software, a medicinal tablet, and the like. In another example, some products might have names that coincide with commonly used phrases, language usage, or slang which increases the frequency of the product title appearing in a volume of text and, therefore, further creating the need to more accurately identify genuine product references. For example, the word Titanic is not only associated with the famous ship that sank in 1912, for which there are countless books, museums references, and online articles written, but there is also a movie and a movie soundtrack by the same name. This problem is, therefore, difficult because a reference initially identified as a product reference, may not be a reference to that product at all. Therefore, being able to accurately identify various types of references to a particular product, or class of products, can be an important tool for identifying and, subsequently, providing one or more hyperlinks to a page for the product, or class of products.

Accordingly, in at least one embodiment, candidate phrases users have used to reference a product in previous searches are identified by analyzing query logs of a search engine. Upon identifying one or more of these candidate phrases within a volume of text, the candidate phrases are compared against a corpus of contemporary language stored in a database. A frequency of each candidate phrase in contemporary language and a frequency of the same in the query logs are determined and used as an indication to distinguish between genuine product references in the text or their normal use in common language. In at least one example, a query log match score can be computed by multiplying a ratio of these two frequencies by a number of times a respective candidate phrase, or one or more candidate phrases indicative of the product, appears in the text. This value is then used to determine whether the candidate phrase, or the one or more candidate phrases indicative of a same product, is a genuine reference if the value is above a threshold value.

Figure 4:
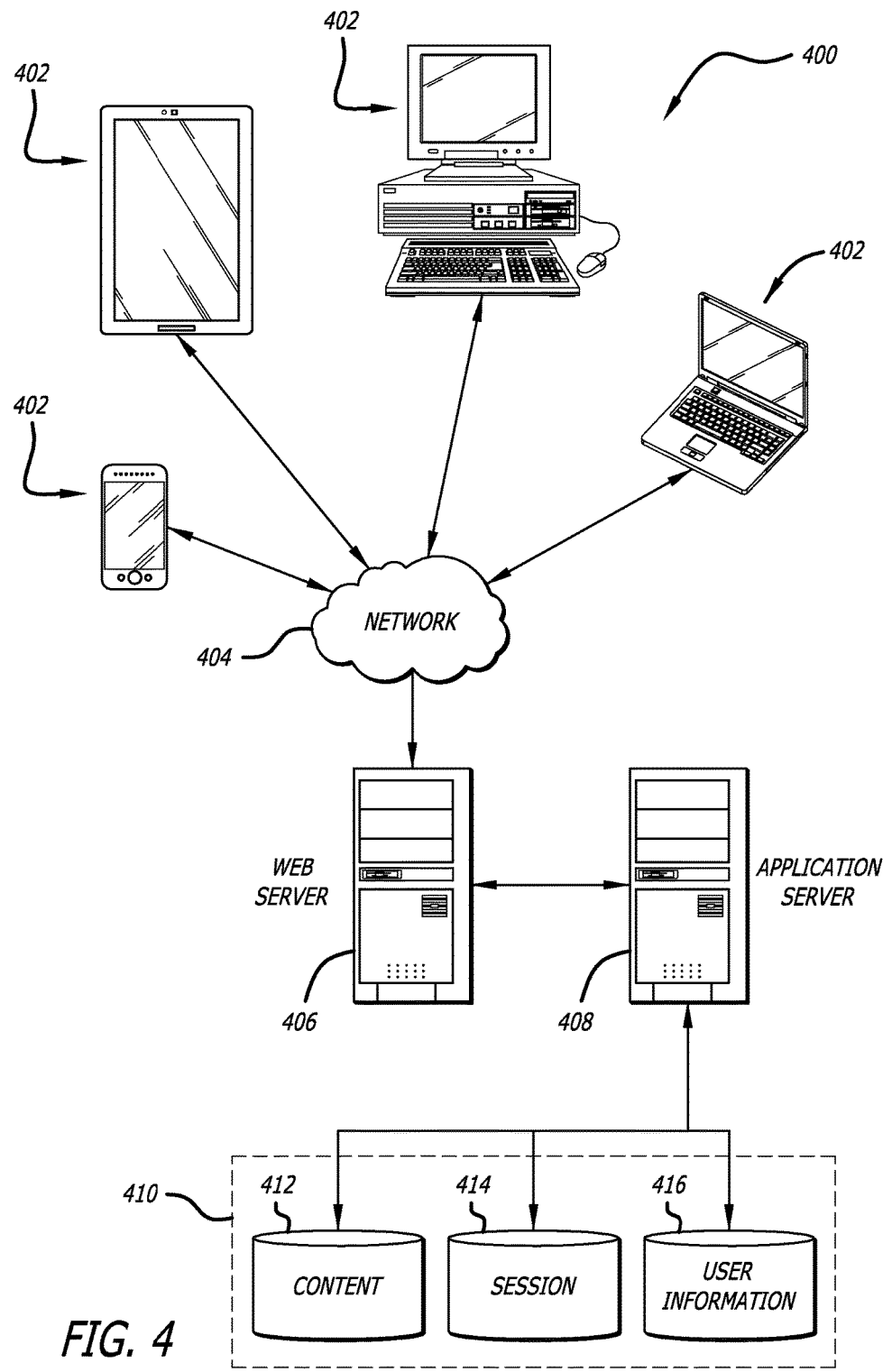
FIG. 4 illustrates an environment in which various embodiments can be implemented.

Different approaches can be implemented in various environments in accordance with various embodiments described herein. For example, FIG. 4 illustrates an example of an environment 400 for implementing aspects in accordance with various embodiments. As will be appreciated, although a Web-based environment is used for purposes of explanation, different environments may be used, as appropriate, to implement various embodiments. The system includes an electronic client device 402, which can include any appropriate device operable to send and receive requests, messages or information over an appropriate network 404 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 406 for receiving requests and serving content in response thereto, although for other networks, an alternative device serving a similar purpose could be used, as would be apparent to one of ordinary skill in the art.

The illustrative environment includes at least one application server 408 and a data store 410. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 408 can include any appropriate hardware and software for integrating with the data store 410 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 406 in the form of HTML, XML or another appropriate structured language in this example. The handling of all requests and responses, as well as the delivery of content between the client device 402 and the application server 408, can be handled by the Web server 406. It should be understood that the Web and application servers are not required and are merely example components, as structured code discussed herein can be executed on any appropriate device or host machine as discussed elsewhere herein.

The data store 410 can include several separate data tables, databases or other data storage mechanisms and media for storing data relating to a particular aspect. For example, the data store illustrated includes mechanisms for storing content (e.g., production data) 412 and user information 416, which can be used to serve content for the production side. The data store is also shown to include a mechanism for storing log or session data 414. It should be understood that there can be many other aspects that may need to be stored in the data store, such as page image information and access rights information, which can be stored in any of the above listed mechanisms as appropriate or in additional mechanisms in the data store 410. The data store 410 is operable, through logic associated therewith, to receive instructions from the application server 408 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 402. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 400 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 400 in FIG. 4 should be taken as being illustrative in nature, and not limiting to the scope of the disclosure.

Figure 5:
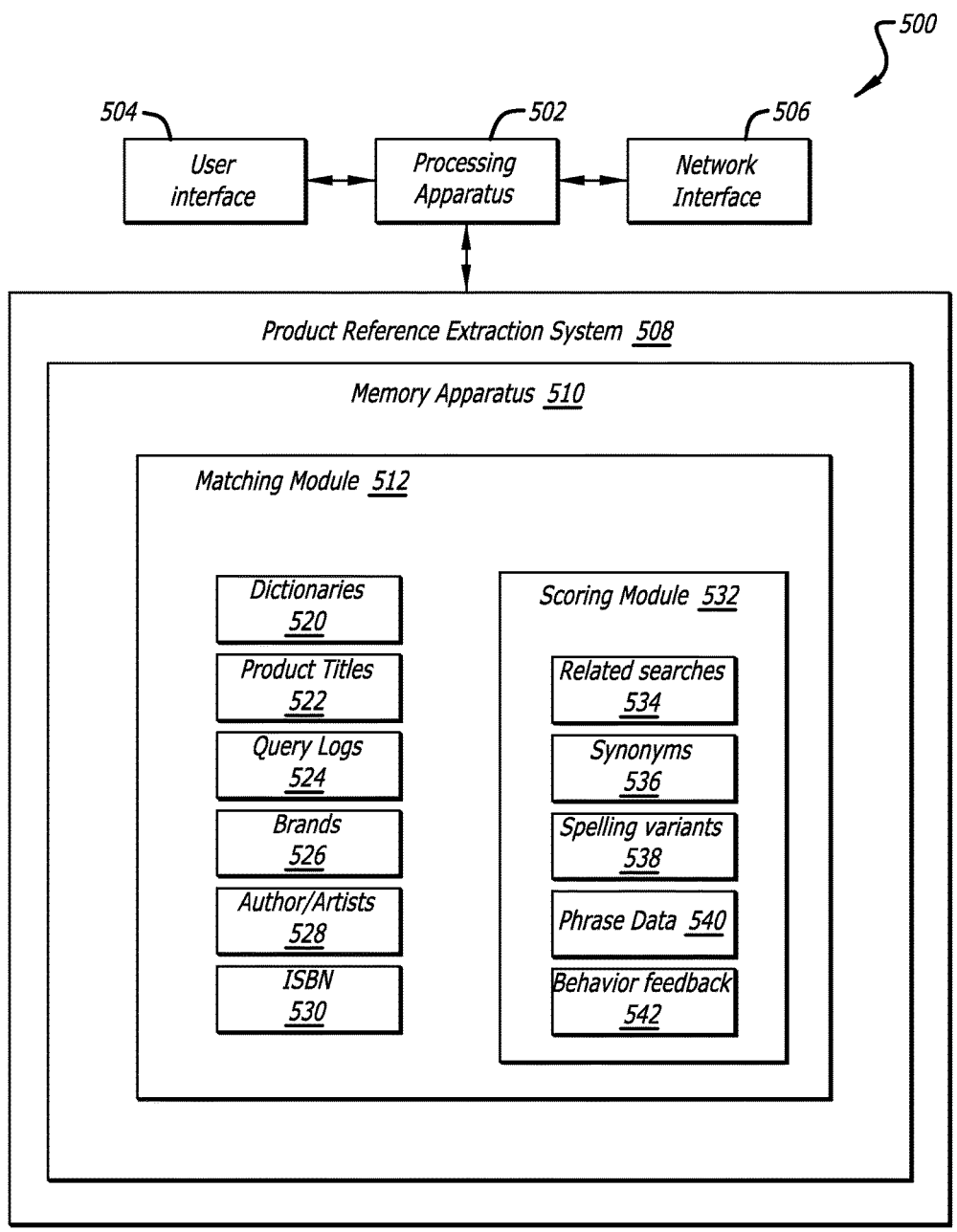
FIG. 5 illustrates an example component level diagram that can be used within an environment such as that illustrated in FIG. 4.

It will be helpful to refer to an example system configured for extracting item or subject references from a volume of text. FIG. 5 provides a block diagram 500 of one such reference extraction system 508. The reference extraction system 508 comprises a user-interface 504, a network-interface 506, and a memory 510 operatively coupled to a processing apparatus 502. It should be understood that FIG. 5 is one of many possible configurations of a system for extracting product, item, or subject references from a volume of text. It should be understood that various other arrangements, components, and data can also be used within the scope of various embodiments.

As described in greater detail below, embodiments of the reference extraction system 508 are generally configured to identify a variety of ways an item or subject can be referred to in a volume of text. To do so, embodiments of the reference extraction system 508 (1) obtain candidate phrases for a plurality of products by analyzing query logs of at least one search engine to identify a set of candidate phrases used by a plurality of users to refer to a product; (2) use data from a corpus of contemporary language usage to compare the relative frequency of a phrase in the language with its relative frequency in query logs as a signal to distinguish between genuine product references and normal language usage; and (3) use behavioral feedback from users concerning automatically detected references to refine future recommendations.

As used herein, the term "apparatus" refers to a device or a combination of devices having the hardware and/or software configured to perform one or more specified functions. Therefore, an apparatus is not necessarily a single device and may, instead, include a plurality of devices that make up the apparatus. The plurality of devices may be directly coupled to one another or may be remote from one another, such as distributed over a network.

It will be understood by one of ordinary skill in the art in light of the present description that, although FIG. 5 illustrates the user interface 504, network interface 506, memory apparatus 510, and processing apparatus 502 as separate blocks in the block diagram, these separations may be merely conceptual. In other words, in some instances, the user interface 504, for example, is a separate and distinct device from the processing apparatus 502 and the memory apparatus 510 and therefore may have its own processor, memory, and software. In other instances, however, the user interface 504 is directly coupled to or integral with at least one part of the processing apparatus 502 and at least one part of the memory apparatus 510 and includes the user interface input and output hardware used by the processing apparatus 502 when the processing apparatus 502 executes user input and output software stored in the memory apparatus 510.

As will be described in greater detail below, in one embodiment, the reference extraction system 508 is entirely contained within a user terminal, such as a personal computer or mobile terminal, while, in other embodiments, the reference extraction system 508 includes a central computing system, one or more network servers, and one or more user terminals in communication with the central computing system via a network and the one or more network servers. FIG. 5 is intended to illustrate both types of configurations as well as other configurations that will be apparent to one of ordinary skill in the art in view of this disclosure.

The user interface 504, in at least one embodiment, includes hardware and/or software for receiving input into the reference extraction system 508 from a user and hardware and/or software for communicating output from the reference extraction system 508 to a user. In some embodiments, the user interface 504 includes one or more user input devices, such as a keyboard, keypad, mouse, microphone, touch screen, touch pad, controller, and/or the like. In some embodiments, the user interface 504 includes one or more user output devices, such as a display (e.g., a monitor, liquid crystal display, one or more light emitting diodes, etc.), a speaker, a tactile output device, a printer, and/or other sensory devices that can be used to communicate information to a person.

In some embodiments, the network interface 506 is configured to receive electronic input from other devices in the network 404, including the data store 410. In some embodiments, the network interface 506 is further configured to send electronic output to other devices in a network.

The processing apparatus 502 includes circuitry used for implementing communication and logic functions of the reference extraction system 508. For example, the processing apparatus 502 may include a digital signal processor device, a microprocessor device, and various analog-to-digital converters, digital-to-analog converters, and other support circuits. Control and signal processing functions of the reference extraction system 508 are allocated between these devices according to their respective capabilities. The processing apparatus 502 may include functionality to operate one or more software programs based on computer-readable instructions thereof, which may be stored in the memory apparatus 510. As described in greater detail below, in one embodiment the memory apparatus 510 includes a modeling application 512 stored therein for instructing the processing apparatus 502 to perform one or more operations of the procedures described herein and in reference to FIGS. 6-7. Some embodiments may include other computer programs stored in the memory apparatus 510.

In general, the memory apparatus 510 is communicatively coupled to the processing apparatus 502 and includes at least one non-transitory computer-readable storage medium for storing computer-readable program code and instructions, as well as data stores containing data and/or databases. More particularly, the memory apparatus 510 may include volatile memory, such as volatile Random Access Memory (RAM) including a cache area for the temporary storage of data. The memory apparatus 510 may also include non-volatile memory that can be embedded and/or may be removable. The non-volatile memory can, for example, comprise an electrically erasable programmable read-only memory (EEPROM), flash memory, or the like. The memory apparatus 510 can store any of a number of pieces of information and data used by the reference extraction system 508 to implement the functions of the reference extraction system 508 described herein.

As further illustrated by FIG. 5, the memory apparatus 510 may also include a matching module 512 to determine matches between candidate phrases within a volume of text and a product. In this example, the matching module 512 includes a data store of at least one dictionary 520 for determining related items and subjects. The matching module 514 may include a store of product titles 522 including a list product references, a query log store 524 including data from user submitted queries from at least one search engine, a store of brand titles 526 for various products, an author/artist reference 528 to match various works of art and books with their respective authors, an ISBN number store 530 to reference various books, and a phrase data store 540. In this example, the matching module 512 further includes a scoring module 532 that determines a matching score for candidate phrases. The scoring module 532 can include data for related searches 534, synonyms 536, spelling variants 538, and behavioral feedback 542 to compare against candidate phrases. Each of these modules, data stores, or elements work together to identify candidate phrases for a plurality of products, items, or subjects and score the same to determine matches to particular items, subjects, and/or products. Other component and/or module arrangements are also possible within the scope of various embodiments.

In various embodiments, the behavioral feedback 540 data may additionally include data stores containing clickstream data and advertisement content data. According to some embodiments, clickstream data includes, for example, information about users' interactions with hyperlinked or search-result items presented to the users in response to the users' submitting search queries or selecting a respective hyperlink. In some embodiments, the clickstream data can be taken from across multiple users. Further, in some embodiments, the clickstream data can be organized around search queries. For example, for each search query or hyperlink selection, the clickstream data may include an indication of the number of times users have submitted the search query, selected a hyperlink, or purchased the associated product.

According to some embodiments, the behavioral feedback 540 data may also include advertisement content data which may include any suitable content related to search-result or hyperlinked items. For example, the advertisement content data may include sponsored links and sponsored ads related to items that are offered for sale by the electronic marketplace or other online retailers. The advertisement content data may include content such as text, graphics, audio, and/or video that may be presented to users in response to users submitting particular search queries, selecting particular hyperlinks, or advertisements.

Figure 6:
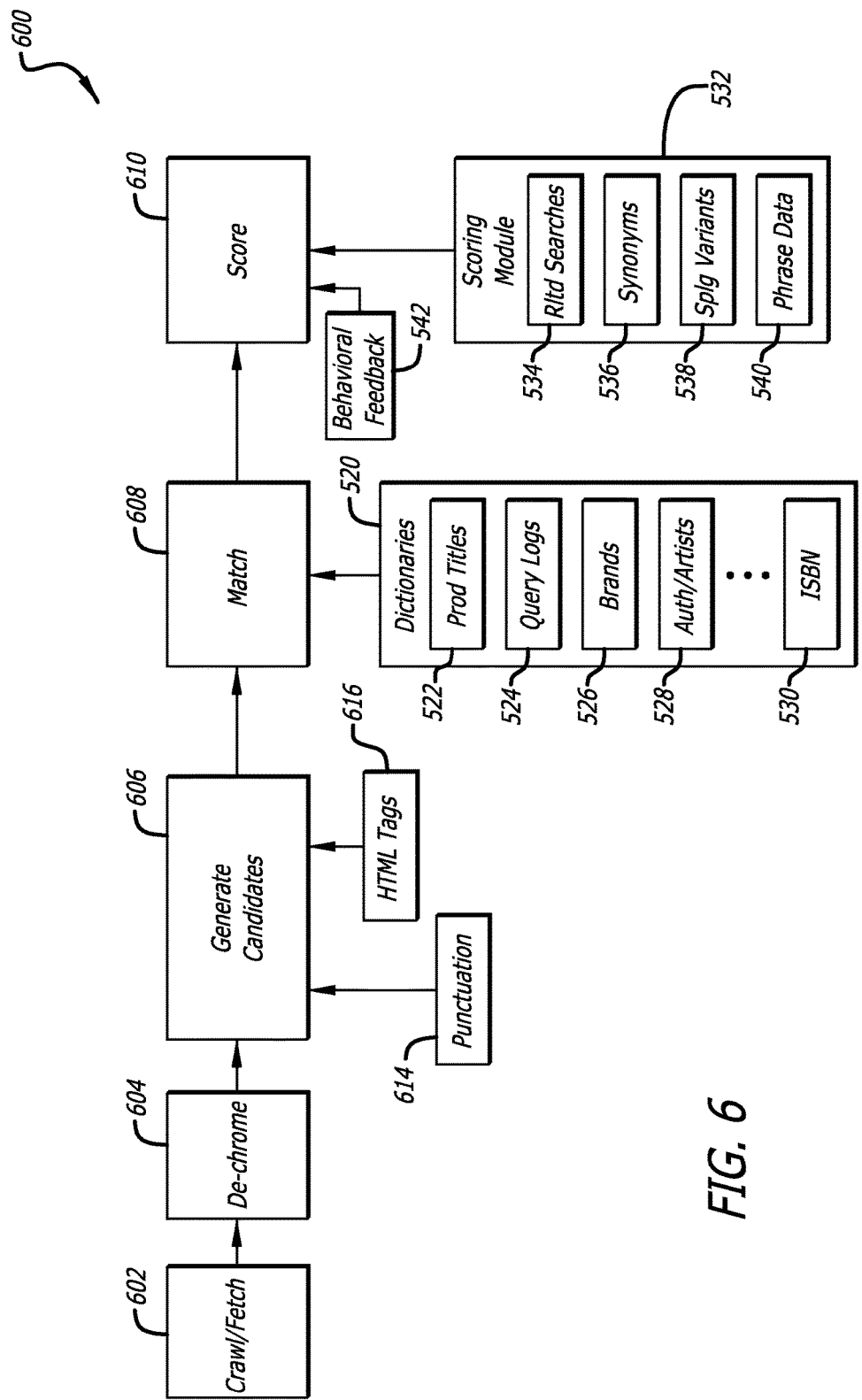
FIG. 6 illustrates an example process for extracting product references from unstructured text that can be used in accordance with at least one embodiment.

FIG. 6 provides a flow diagram illustrating a process 600 whereby the system of FIG. 5 is used to identify references to products in unstructured text, in accordance with at least one embodiment. Portions of the process 600 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. As indicated at block 602, the process 600 generally begins by a web crawler analyzing data associated with various data sources throughout the web (e.g., crawling or fetching data). In one example, the web crawler gathers and classifies web data on behalf of a content provider, advertiser, or search engine. In this example, when a webpage is analyzed, its chrome 604, such as a page's header, navigational tools, and the like, is removed.

Once the chrome has been removed, text of the webpage is analyzed to identify candidate phrases 606 in the form of n-grams, which are any n consecutive words in a sentence or line of text. In identifying n-grams, punctuation 614 and HTML tags 616 are respected so that only words adjacent to each other in a sentence or within the same particular heading, etc. are considered. Many n-gram lengths can be considered, for example, and all n-grams from uni-grams to n-grams can be analyzed as potential candidate phrases. In one example, the candidate phrases are identified in part by referencing items in a phrase data and the like stored for various n-grams. As indicated at block 608, the process 600 moves to the matching module 518 where each n-gram is compared against data in the data store of dictionaries 520 which includes product titles 522, query log data 524, brands 526, author and artist 528, and an ISBN 530. In this example, the data store of dictionaries 520 additionally includes a corpus of contemporary language against which the candidate phrases are compared to determine how often a particular candidate phrase appears in language in general. In one example, the corpus of contemporary language, which can include literary works, such as books and articles, scanned into a database, includes n-gram statistics including how many times a particular n-gram appears in the corpus. Therefore, a frequency of a particular n-gram appearing in contemporary language can be determined. Additionally, a frequency of a particular n-gram appearing in the query logs can also be determined. Accordingly, the output from the matching module 518 is a subset of the initial candidate phrases matching data in the data store of dictionaries 520 along with their frequencies in contemporary language and in the query logs respectively.

As indicated at block 610, the process 600 moves the subset of candidate phrases to the scoring module 532 to determine a query log match score for the webpage currently being analyzed. In order to determine the query log match score, the scoring module 532 takes qualities such as the frequency of appearance of the n-grams in both the query logs, corpus of contemporary language data, and the number of times the same appears within the webpage currently being analyzed as inputs. Additionally, the length of an n-gram can also be considered based on the assumption that a phrase becomes more specific with the inclusion of more words and, therefore, is more likely to be a deliberate match, and not just a spurious match as is more common for uni-grams and bi-grams. Further, the scoring module 532 may also take into account data for related searches 534, synonyms 536, spelling variants 538, phrase data 540, and user behavioral feedback 542, as described above.

The query log match score can be determined using any scoring method or weighting system taking into account one or more of these data dimensions. In one example, the query log match score can be computed by multiplying a ratio of the frequency of the one or more n-grams indicative of the same product (or item) appearing in the query logs 524 and the contemporary language dictionaries 520 by a number of times a respective n-grams, or one or more n-grams indicative of the product, appears in the text. This value is then be used to determine whether the n-gram(s), or candidate phrase(s), is a genuine reference if the query log match score is above a threshold value.

Figure 7:
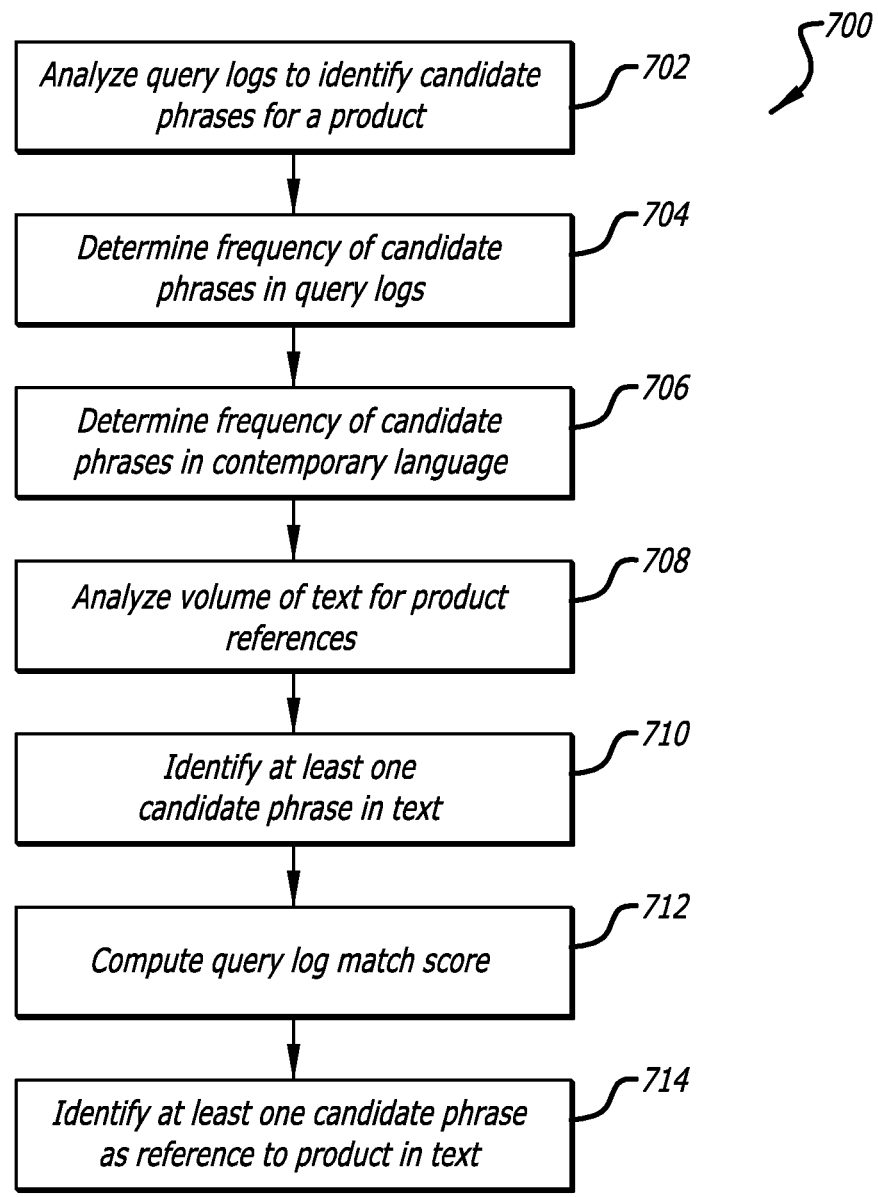
FIG. 7 illustrates another example process for extracting product references from unstructured text that can be used in accordance with at least one embodiment.

FIG. 7 illustrates an example process 700 for identifying and extracting product reference from unstructured text that can be used in accordance with various embodiments. It should be understood that, for this and other processes discussed herein, there can be additional, fewer, or alternative steps, performed in similar or alternative steps, or in parallel, within the scope of the various embodiments unless otherwise stated. In this example, query logs of at least one search engine are analyzed to identify a set of candidate phrases used by a plurality of users to refer to a product 702. Based on the information from the query logs, a first frequency of each candidate phrase in the query logs is determined 704. The first frequency, therefore, is the number of times users have submitted a search query that included one of the candidate phrases.

In this example, a second frequency associated with the number of times each candidate phrase appears in a corpus of contemporary language data stored in a database is determined 706. The goal of determining the second frequency is to identify how many times a particular candidate phrase appears in everyday language in general. For example, if a particular phrase appears often in the corpus of contemporary language data, then there is a higher chance that the particular phrase is not a reference to the product, such as if the product was named after a commonly used phrase. For example, the uni-gram "Lost" can be a reference to the TV show or it can be a reference to something being lost, which appears often in contemporary language.

In this example, a volume of unstructured text, such as a webpage article, is analyzed 708 to identify at least one reference to the product. Accordingly, in this example, at least one candidate phrase from the set of candidate phrases is identified 710 in the unstructured text. A query log match score is computed 712 by multiplying a ratio of the first frequency and the second frequency by a number of occurrences of the at least one candidate phrase in the unstructured text. In response to the query log match score being above a threshold value, at least one candidate phrase is identified 714 as being a genuine reference to the product or identifying the volume of unstructured text as containing a reference to the product above a significance threshold.

In one example implementation, the candidate phrases are associated with at least one word for a product and an electronic marketplace can identify these references to products in an automated fashion for converting the same into hyperlinks to a product or a product search results page for monetizing the content in response to identifying references to the products above the significance threshold. In one example, a publisher publishing content about Golf on a blog could provide hyperlinked keywords or phrases within their golf news articles, how-to articles, equipment reviews, or other information pages to associated golf product pages of the electronic marketplace. Accordingly, if visitors of the Golf blog click on a hyperlink and purchase a corresponding product, the electronic marketplace can provide the golf blog with a percentage of the profits or revenue in return for accepting and hosting the hyperlink.

Behavioral data associated with user and/or publisher interaction with various aspects of the hyperlinks can be tracked over time to better identify suitable product references and tailor future hyperlink suggests. In particular, interaction with items of content (e.g., viewing, purchasing items, converting, accepting a hyperlink, etc.) responsive to search requests or hyperlink selections for particular candidate phrases may increase associated query log match scores as discussed elsewhere herein. For example, if a golf blog chooses to provide a hyperlink and many users click on the hyperlink, then an electronic marketplace may determine that the link was a success and will search for other instances of product references similar to the golf blog in other websites. Additionally, the query log match scores could also increase to a higher degree of relevance if many users click on the hyperlink and purchase the associated product. Furthermore, the electronic marketplace can contact the publisher of a website to suggest hyperlinks to products within their content upon determining that conditions surrounding a product reference are substantially similar to the conditions of a successful link, such as described with respect to the golf blog. The conditions surrounding the product reference could, in various instances, include data associated with user views, demographic information, the site's targeted audience or general popularity, a number of references or keywords similar to a respective product on a page, among others, and in various combinations thereof. This information can, therefore, increase confidence or the query log match score for a particular candidate phrase. Conversely, the query log match score for a product can be decreased if a hyperlink is provided and very few to no users click thereon or make a purchase.

Further, the publisher's decision to accept or decline to host a hyperlink can further provide feedback for making future offers and suggestions. For example, if a suggestion is made to a publisher to provide a link for a particular product and the publisher chooses to accept, a system in accordance with various embodiments can store this information to identify other similar websites with similar references. Conversely, data associated with conditions and circumstances associated with a publisher declining to host a hyperlink can also be stored to narrow down a list of potential websites. Various other feedback approaches can be used as well as discussed or suggested elsewhere herein.

In another example implementation, referring back to FIG. 1, the advertiser of the TV mounting system might desire to place ads of a particular mount that is only compatible with Brand #1. In this example, a system using the teaching described herein could identify multiple textual references with the webpage 100 associated with Brand #1 by identifying the candidate phrases 102, 104, and maybe 106 and 110 as being ways users have used to reference products related to Brand #1 in previous searches by analyzing query logs of a search engine. Upon identifying the candidate phrases 102, 104, 106, and 110 within a volume of text, these candidate phrases are compared against the corpus of contemporary language. A frequency of each candidate phrase in contemporary language and a frequency of the same in the query logs are determined and used as an indication to distinguish between genuine product references in the text or their normal use in common language. In this example, candidate phrases 102 and 104 are going to appear very infrequently in contemporary language, indicating a likely match upon determining the query log match score. In this example, the query log match score is computed by multiplying a ratio of these two frequencies by a number of times a respective candidate phrase appears in the text. This value is then be used to determine whether the candidate phrase, or the one or more candidate phrases indicative of a same product, is a genuine reference if the value is above a threshold value. In this example, the query log match score will be above the threshold value based at least in part on the number of matching candidate phrases and the infrequency of candidate phrases 102 and 104 in contemporary language. The webpage 100 is then categorized including at least a reference to the same containing at least a minimum amount of information associated with Brand #1.

In other example implementations, references to various subjects in unstructured text can also be identified to augment various other applications. For example, an electronic book or e-reader could utilize the method described herein to identify various nicknames of famous people in a body of text in order to provide users with supplemental information thereof. Many other applications and use cases are also possible within the scope of the various embodiments discussed herein.

In some instances, users select and submit search queries with the intention of obtaining information about particular items for consumption, including, but not limited to, consumer products, services, electronic content, access rights to content, and, generally, any items that may be consumed. For example, a user seeking information about a particular camera may select and submit a search query the user believes describes the particular camera. The selected search query, for example, may correspond to the brand and model of the camera (e.g., "Canon® EOS 7D camera"). For illustrative convenience, this type of searching is referred to herein as "specific" searching. However, it should be appreciated that other terms are commonly used to refer to this type of searching. Such terms include "navigational" searching. When a user's intention is specific searching, the user likely prefers a small number of search results that are limited to information about a particular product. However, when users select and submit search queries with the intention of specific searching, search engines often do not recognize the users' intentions. Accordingly, search engines often return search results that include information about a range of products, even though the user may prefer that the search results be limited to information about a particular product.

In other instances, users select and submit search queries with the intention of obtaining information about a range of products. For example, a user that wants to research different types of products related to a category may select and submit a search query that corresponds to a description of the category, such as "women's clothing" or "toys." Also, for example, a user that wants to research a range of products may select and submit a search query that correspond to a brand name (e.g., Canon®, Adidas®) associated with a large number of products. For illustrative convenience, this type of searching is referred to herein as "general" searching. However, it should be appreciated that other terms are commonly used to refer to this type of searching. Such terms include "informational" searching. When a user's intention is general searching, the user likely prefers a large number of search results that include information about a relatively broad range of products. For example, the user that submitted "toys" as a search query may not have a particular toy in mind. Instead, that user may be general searching with the intention of browsing across a large number of toys for the purpose of selecting a gift. However, if the search engine does not recognize that the user is general searching, the search results may be skewed toward a smaller selection of toys. Thus, the user may be dissatisfied with the limited scope of the search results and navigate away from the website.

In still other instances, users select and submit search queries with intentions that fall somewhere between specific and general searching. In these instances, for example, the user may have a general idea of the product of interest, but the user may not have a particular product in mind. For example, a user seeking information about lenses suitable for a Canon® camera may select and submit a search query the user believes fairly specifically describes what the user is searching for. The selected search query, for example, may be "Canon® lenses." Because the user only wants to research lenses suitable for a Canon® camera, the user's intention is not purely general searching for lenses. Further, because the user does not have a particular type and model of lens in mind, the user's intention is not purely specific searching. Accordingly, the user's intention falls somewhere between specific and general searching. In this case, the user likely prefers a reasonable number of search results that include information about a variety of camera lenses that are suitable for use with a Canon® camera. If the search service does not recognize the user's intention, it may deliver search results that are too broad or too specific. Other examples of search queries that fall somewhere between specific and general searching include "scissors," "water guns," "guitar picks," as well as artists or brands with small numbers of products.

Systems and methods described and suggested herein utilize various techniques to assess the degree of specificity of search queries. By assessing the degree of specificity of search queries, the systems and methods may be used to determine where the submitting users' intentions fall along the continuum between specific and general searching. Thus, the systems and methods may be used to deliver search results that more closely coincide with the users' intentions. For example, if clickstream data associated with a particular search query indicates that users typically submit the search query with the intention of specific searching, then embodiments may tailor search results to include a limited number of highly relevant search-result items. On the other hand, for example, if clickstream data associated with a particular search query indicates that users typically submit the search query with the intention of general searching, then embodiments may tailor search results to include a diverse set of search-result items from multiple categories. Further, for example, if clickstream data associated with a particular search query indicates that users typically submit the search query with intentions that fall somewhere between general and specific searching, then embodiments may tailor search results by highlighting highly relevant items as well as including a moderately diverse set of search-result items from different categories.

In operation, to assess the degree of specificity of a search query, clickstream data associated with the search query is obtained. According to some embodiments, the clickstream data is taken from across multiple users. The clickstream data associated with a search query may include, for example, an indication of the number of times users have submitted the search query and a list of search-result items that have been included in search results presented to users in response to the users' submission of the search query. For each of the search-result items, the clickstream data may include an indication of the number of times the search-result item has been included in search results presented to users in response to the users' submission of the search query, the rank assigned to the search-result item, and an indication of the number of first-clicks the search-result item received, where the number of first-clicks represents the number of times users selected the search-result item first among all of the other search-result items presented to users in response to the users' submission of the search query. It should be appreciated that, in addition to clicking, users may select a search-result item by previewing, hovering, or otherwise interacting with the search-result item. It should be appreciated that instead of or in addition to including an indication of the number of first-clicks the search-result item received, the clickstream data may include an indication of the first two clicks received, all clicks received, the number of previews, shopping-cart adds, downloads, etc.

Using relevant clickstream data, embodiments calculate first-click entropy for the search query. According to some embodiments, first-click entropy represents first-click variation. For example, first-click entropy of a search query is relatively small if most of the users first-click the same search-result item, whereas first-click entropy of a search query is relatively large if each of the users first-clicks a different search-result item. According to an embodiment, first-click entropy is based at least in part on the set of first-click probability values of the search-result items presented to users in response to the users' submission of the search query. The first-click probability value of a search-result item represents the probability that the search-result item will be selected first among all search-result items. Although examples provided herein calculate and use first-click entropy to assess the degree of specificity of search queries, it should be appreciated that some embodiments could calculate and use click entropy for all clicks to assess the degree of specificity of search queries.

According to some embodiments, to calculate the first-click probability value of a search-result item, the number of first-clicks the search-result item received is divided by the first-clicks across all search results. It should be appreciated, however, that other embodiments divide the number of first-clicks the search-result item received by the number of times the search-result item was included in search results presented to users in response to the users' submission of the search query. Further, it should be appreciated that other embodiments calculate the first-click probability value for a search-result item by dividing the number of first-clicks the search-result item received by the number of times users have submitted the search query.

Embodiments convert the first-click entropy into a specificity score. According to some embodiments, first-click entropy of zero is mapped to a specificity score of one, and first-click entropy of infinity is mapped to a specificity score of zero. Accordingly, the closer the specificity score is to one, the more the first-clicks are skewed toward a single search-result item and the more likely the search query is submitted by users with the intention of specific searching. On the other hand, the closer the specificity value is to zero, the more the first-clicks are distributed across the search-result items and the more likely the search query is submitted by users with the intention of information searching. Although examples provided herein described calculating a specificity score based in part on data related to first-clicks, it should be appreciated that the specificity score could be calculated using data related to first two clicks, all clicks, previews, shopping-cart adds, downloads, etc.

Embodiments utilize the specificity score of the search query to tailor search results presented to users in response to the users' submission of the search query. The search results may be tailored so as to conform with the intention of the users that are submitting the search query. If the specificity score of the search query is close to one, embodiments may reference the first-click probability values of the search-result items to identify one or more (such as the top one or two) search-result items and only include those search-result items in the search results, thereby making it easy for users to navigate directly to the search-result item the users had in mind when they submitted the search query. If the specificity score of the search query is close to zero, embodiments may reference the first-click probability values to identify the most popular search-result items across a broad range of items and populate the search results with those items, thereby making it easy for users to view a broad range of search-result items. Embodiments may tailor the search results on a sliding scale commensurate with the specificity score.

In at least one embodiment, a set of search requests (e.g., a set of historical search requests) may be analyzed to detect fixed phrases suitable for inclusion in a search index (e.g., an index of a collection of content) and/or for parsing from further search requests. For the purposes of this description, it will be helpful to distinguish between a single word utilized to index content in the search index (hereinafter "keyword") and a plurality of words in a particular order utilized to index content in the search index distinct from keywords (hereinafter "fixed phrase"). For example, "Newton" and "Baker" may be keywords in the search index, and "Newton Baker" a fixed phrase, while "Baker Newton" would be considered a distinct fixed phrase if added to the search index. In the example of the matrix associating search terms with content in the collection, each keyword and each fixed phrase may correspond to a distinct row of query log match scores with respect to items of content in the collection. Keywords and fixed phrases included in the search index (indexed keywords and indexed fixed phrases) may be targeted in particular for parsing from search requests. Furthermore, query log match scores may have a searcher feedback component. For example, searcher interaction with items of content (e.g., accessing the items) responsive to search requests including particular fixed phrases may increase associated query log match scores.

A set of candidate phrases may be identified in the set of search requests, and grouped by phrase length (i.e., number of words). For example, the raw search query strings may be processed to remove stop words, logical operators, and so on. Statistically significant phrases may be detected among the candidates of each group, and added to the search index as fixed phrases. For example, a candidate phrase having a pointwise mutual information with respect to its component words that is greater than a threshold may be detected as statistically significant relative to the candidates of a particular group. The threshold may be determined for each set of candidate phrases and/or each group. For example, the threshold may be based on a greatest pointwise mutual information for the set and an exponential model.

In at least one embodiment, fixed phrase detection may be further enhanced by first clustering keywords with respect to the collection of content. For example, a latent Dirichlet allocation (LDA) may be utilized to cluster the keywords into a specified number of topics (defined by the keywords that they cluster). Such topics may be referred to herein as automatically allocated topics, unsupervised topics and/or LDA topics to distinguish them from categories and/or groups into which keywords are manually placed and/or allocated. Sets of candidate phrases (candidate phrase clusters) may then be identified with respect to the clusters. For example, a particular candidate phrase may be considered in a particular cluster if each of its component keywords is in the cluster. Statistically significant phrases may be then be detected with respect to the candidate phrase clusters, and added to the search index as fixed phrases. In at least one embodiment, such detection of fixed phrases with respect to clusters may significantly enhance a user search experience, for example, by returning more relevant results.

Various embodiments make use of user behavioral feedback. In at least one embodiment, behavioral feedback is used to validate a link or webpage which has been categorized or indexed utilizing the method described above. For example, if a query log match score for a particular webpage was indicative of the subject matter therein matching to a relatively high degree and if a relatively high frequency of users providing similar searches ended up clicking on a link (converting) to the particular webpage, then the scoring could incremented upward. Conversely, if a query log match score is indicative of the subject matter matching to a relatively high degree and if a relatively high frequency of users providing similar searches has ignored the link, then the scoring could incremented downward. Other user behavioral feedback techniques can also be used as discussed and suggested elsewhere herein.

Various embodiments can be utilized within an electronic marketplace environment. In one instance, an electronic marketplace may offer an administrator of a webpage a sales percentage of products sold through a product link to the electronic marketplace provided on their page. For example, an electronic marketplace may approach an administrator of an electronics blog and ask the administrator to provide a link on their blog to a page of the electronic marketplace where tablet computers are sold. In return for providing the link, the electronic marketplace will share a percentage of sales from customers that have navigated thereto via the link and who have made a purchase. In one example, if the administrator chooses to accept the electronic marketplace's invitation and display the link, the query log match score for the electronic blog can be incremented upward for tablet computers. Conversely, if the administrator chooses to decline the offer, the query log match score could be incremented downward. Further, such feedback can be used for fraud detection. For example, if a webpage administrator requests a link for their webpage, but no references to any relevant product can be identified, the electronic marketplace may choose to decline creating a link.

Figures 8A, 8B:
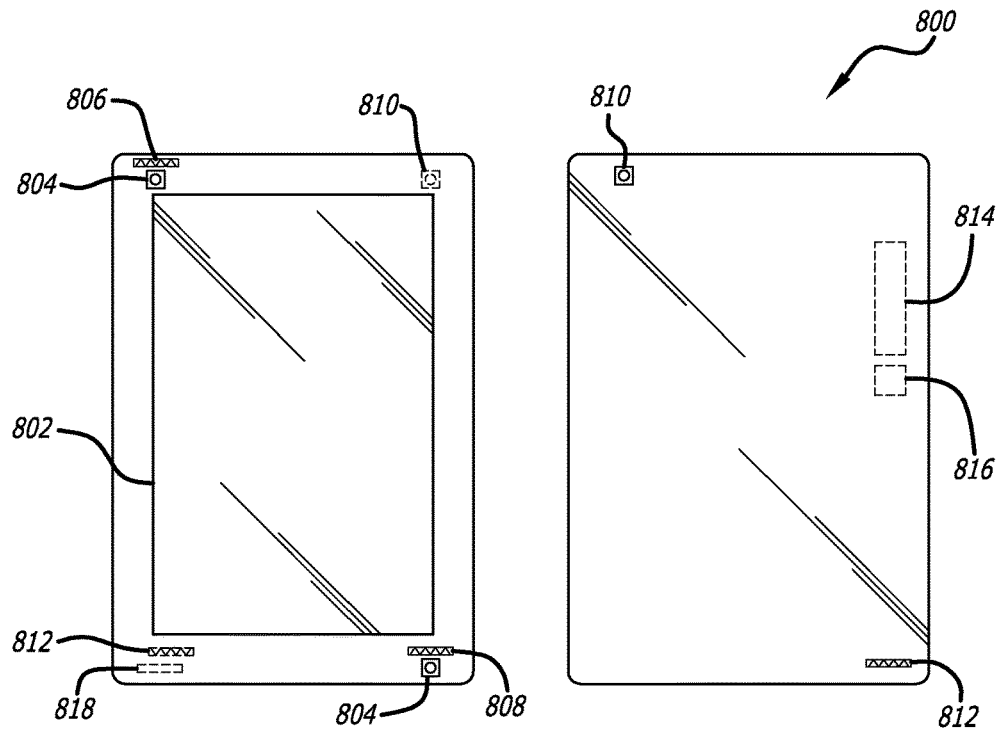
FIGS. 8A and 8B illustrate an example computing device that can be used to implement aspects of various embodiments.

FIGS. 8A and 8B illustrate front and back views, respectively, of an example electronic computing device 800 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 800 has a display screen 802 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 804 on the front of the device and at least one image capture element 810 on the back of the device. It should be understood, however, that image capture elements could also, or alternatively, be placed on the sides or corners of the device, and that there can be any appropriate number of capture elements of similar or different types. Each image capture element 804 and 810 may be, for example, a camera, a charge-coupled device (CCD), a motion detection sensor or an infrared sensor, or other image capturing technology.

As discussed, the device can use the images (e.g., still or video) captured from the imaging elements 804 and 810 to generate a three-dimensional simulation of the surrounding environment (e.g., a virtual reality of the surrounding environment for display on the display element of the device). Further, the device can utilize outputs from at least one of the image capture elements 804 and 810 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 808 on the front side, one microphone 812 on the back, and one microphone 806 on or near a top or side of the device. In some devices there may be only one microphone, while in other devices there might be at least one microphone on each side and/or corner of the device, or in other appropriate locations.

The device 800 in this example also includes one or more orientation- or position-determining elements 818 operable to provide information such as a position, direction, motion, or orientation of the device. These elements can include, for example, accelerometers, inertial sensors, electronic gyroscopes, and electronic compasses.

The example device also includes at least one communication mechanism 814, such as may include at least one wired or wireless component operable to communicate with one or more electronic devices. The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

Figure 9:
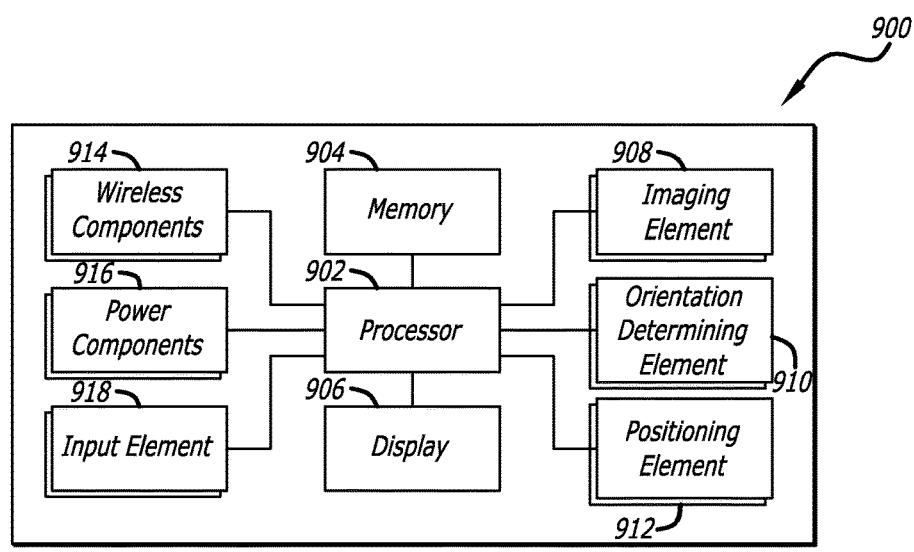
FIG. 9 illustrates example components that can be used with a device such as that illustrated in FIGS. 8A and 8B.

FIG. 9 illustrates a set of basic components of an electronic computing device 900 such as the device 800 described with respect to FIG. 8. In this example, the device includes at least one processing unit 902 for executing instructions that can be stored in a memory device or element 904. As would be apparent to one of ordinary skill in the art, the device can include many types of memory, data storage, or computer-readable media, such as a first data storage for program instructions for execution by the processing unit(s) 902, the same or separate storage can be used for images or data, a removable memory can be available for sharing information with other devices, and any number of communication approaches can be available for sharing with other devices.

The device typically will include some type of display element 906, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 908, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 900 also includes at least one orientation determining element 910 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 900. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 912 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 914 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 916, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 918 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
analyzing one or more query logs of at least one search engine to generate a set of candidate phrases used by one or more of a plurality of users, at least some of the candidate phrases being used in text that refers to a product;
analyzing an amount of unstructured text of a specified webpage;
identifying, from the unstructured text, a candidate phrase from the set of candidate phrases;
determining a first frequency of the candidate phrase in the one or more query logs;
determining a second frequency of the candidate phrase in a corpus of contemporary language stored in at least one database, the corpus of contemporary language storing words or phrases that appear in a predetermined language set from at least a phrase data store;
determining a length of the candidate phrase and assigning a length weight to the candidate phrase, the length weight being larger for longer candidate phrases than for shorter candidate phrases;
computing a query log match score for the candidate phrase by multiplying a ratio of the first frequency to the second frequency by a number of occurrences of the candidate phrase in the unstructured text;
modifying the query log match score using user purchasing information associated with the product and the length weight to generate a modified query log match score;
determining that the modified query log match score is greater than a threshold score; and
providing a suggestion to a publisher of the specified webpage to create a hyperlink of the candidate phrase.

2. The computer-implemented method of claim 1, wherein analyzing the amount of unstructured text includes removing one or more non-text features from the specified webpage.

3. The computer-implemented method of claim 1, wherein the suggestion is provided by an electronic marketplace, the product being available for purchase from the electronic marketplace, and the hyperlink being a link to at least one of a product page for the product or a search results page for a class of products associated with the product.

4. The computer-implemented method of claim 3, further comprising:
tracking at least one of a click through rate, conversion rate, or abandonment rate for users selecting the hyperlink.

5. The computer-implemented method of claim 1, wherein the corpus of contemporary language at least includes literary works that have been scanned into the at least one database.

6. The computer-implemented method of claim 1, wherein modifying the query log match score comprises increasing the query log match score.

7. A computer-implemented method, comprising:
under the control of one or more computer systems configured with executable instructions,
generating a set of candidate phrases indicative of a reference to at least one of an item or a subject by analyzing search queries provided by a plurality of users;
analyzing content to identify at least one candidate phrase of the set of candidate phrases within the content;
comparing each of the at least one identified candidate phrase against language data, including at least a corpus of contemporary language, storing words or phrases that appear in a predetermined language set from at least a phrase data store to determine a rate of occurrence of each of the at least one identified candidate phrase in the language data;
determining a length of the at least one candidate phrase;
assigning a length weight to the at least one candidate phrase, the length weight being larger for longer candidate phrases than for shorter candidate phrases;
determining a query log match score for the at least one identified candidate phrase based at least in part on the rate of occurrence of each of the at least one candidate phrase in the language data and a number of times the at least one candidate phrase appears in the content, and modifying the query log match score using user purchasing information associated with the item or subject and the length weight;
determining that the modified query log match score is greater than a threshold score;
identifying the content as containing a reference to at least one of the item or the subject above a significance threshold; and
determining a rate of occurrence of each of the at least one identified candidate phrase in the search queries provided by the plurality of users, wherein determining the query log match score for the content includes multiplying a ratio of the rate of occurrence of each of the at least one identified candidate phrase in the search queries to the rate of occurrence of each of the at least one identified candidate phrase in general language by a number of occurrences of the at least one candidate phrase in the content.

8. The computer-implemented method of claim 7, further comprising:
providing a suggestion to a publisher of the content to create a hyperlink of the at least one candidate phrase based at least in part on the query log match score being greater than a threshold score.

9. The computer-implemented method of claim 8, further comprising:

monitoring user behavioral feedback with respect to the hyperlink; and
adjusting the query log match score for the content upward when a user requests selects the hyperlink.

10. The computer-implemented method of claim 8, wherein the suggestion is provided by an electronic marketplace, the content being available for purchase from the electronic marketplace, and the hyperlink being a link to at least one of a product page for the product or a search results page for a class of products associated with the product.

11. The computer-implemented method of claim 7, wherein the language data at least includes literary works that have been scanned into at least one database.

12. The computer-implemented method of claim 11, wherein the language data further includes at least one of a general dictionary, a product title dictionary, a product brand dictionary, or authors and artists dictionary.

13. The computer-implemented method of claim 11, wherein each candidate phrase is an n-gram, and wherein the language data includes rate of occurrence statistics for a plurality of n-grams appearing in the literary works.

14. The computer-implemented method of claim 7, wherein the content is a webpage and analyzing the content includes removing chrome from the webpage.

15. A computing device, comprising:
a processor;
a display screen; and
memory including instructions that, when executed by the processor, cause the computing device to:
generate a set of candidate phrases indicative of a reference to at least one of an item or a subject by analyzing search queries provided by a plurality of users;
analyze content to identify at least one candidate phrase of the set of candidate phrases within the content;
compare each of the at least one identified candidate phrase against language data, including at least a corpus of contemporary language, storing words or phrases that appear in a predetermined language set from at least a phrase data store to determine a rate of occurrence of each of the at least one identified candidate phrase in the language data;
determine a length of the at least one candidate phrase;
assign a length weight to the at least one candidate phrase, the length weight being larger for longer candidate phrases than for shorter candidate phrases;
determine a query log match score for the at least one identified candidate phrase based at least in part on the rate of occurrence of each of the at least one candidate phrase in the language data and a number of times the at least one candidate phrase appears in the content, and modify the query log match score by using user purchasing information associated with the item or subject and the length weight;
identify the content as containing a reference to at least one of the item or the subject above a significance threshold based at least in part on the query log match score; and
determine a rate of occurrence of each of the at least one identified candidate phrase in the search queries provided by the plurality of users, the query log match score for the content being determined by multiplying a ratio of the rate of occurrence of each of the at least one identified candidate phrase in the search queries and the rate of occurrence of each of the at least one identified candidate phrase in general language by a number of occurrences of the at least one candidate phrase in the content.

16. The computing device of claim 15, wherein the instructions, when executed by the processor, further enable the computing device to:
identify the at least one identified candidate phrase as being at least one reference to at least one of the item or the subject in response to the query log match score being above a threshold value.

17. The computing device of claim 15, wherein the instructions, when executed by the processor, further enable the computing device to:
provide a suggestion to a publisher of the content to create a hyperlink of the at least one candidate phrase based at least in part on the query log match score being greater than a threshold score.

18. The computing device of claim 17, wherein the suggestion is provided by an electronic marketplace, the content being available for purchase from the electronic marketplace, and the hyperlink being a link to at least one of a product page for the product or a search results page for a class of products associated with the product.

19. The computing device of claim 15, wherein the content is a webpage and analyzing the content includes removing chrome from the webpage.

20. A non-transitory computer-readable storage medium storing instructions that, when executed by at least one processor, cause a computing device to:
analyze query logs of at least one search engine to generate a set of candidate phrases used by a plurality of users to refer to a product;
analyze an amount of unstructured text of a webpage;
identify, from the unstructured text, a candidate phrase from the set of candidate phrases;
determine a frequency of the candidate phrase in the query logs;
determine a frequency of the candidate phrase in contemporary language data including at least a corpus of contemporary language storing words or phrases that appear in a predetermined language set from at least a phrase data store; and
identify the unstructured text as containing a reference to the product above a significance threshold based at least in part on the ratio of the frequency of the candidate phrase in the query logs to the frequency of the candidate phrase in the contemporary language data, multiplied by a number of occurrences of the candidate phrase in the unstructured text, user purchasing information associated with the product, and a length weight corresponding to a length of the candidate phrase, a longer candidate phase having a larger length weight than a shorter candidate phrase.

21. The non-transitory computer-readable storage medium of claim 20, wherein the amount of unstructured text is a webpage, and wherein analyzing the amount of unstructured text includes removing chrome from the webpage.

22. The non-transitory computer-readable storage medium of claim 21, wherein the instructions that, when executed by the at least one processor, further cause the computing device to:
provide a suggestion to a publisher of the unstructured text to create a hyperlink of the candidate phrase.

23. The non-transitory computer-readable storage medium of claim 22, wherein the instructions that, when executed by the at least one processor, further cause the computing device to:

monitor user behavioral feedback with respect to the hyperlink; and adjust a match score for the unstructured text upward when a user selects the hyperlink.

24. The non-transitory computer-readable storage medium of claim 20, wherein the contemporary language data at least includes literary works that have been scanned into at least one database.

25. The non-transitory computer-readable storage medium of claim 24, wherein each candidate phrase is an n-gram, and wherein the contemporary language data includes rate of occurrence statistics for a plurality of n-grams appearing in the literary works.

* * * * *